United States Patent
Tu et al.

(10) Patent No.: US 12,298,509 B2
(45) Date of Patent: May 13, 2025

(54) HEAD MOUNTED DISPLAY

(71) Applicant: Acer Incorporated, New Taipei (TW)

(72) Inventors: Tsung-Wei Tu, New Taipei (TW);
Yi-Jung Chiu, New Taipei (TW);
Shih-Ting Huang, New Taipei (TW);
Yen-Hsien Li, New Taipei (TW)

(73) Assignee: Acer Incorporated, New Taipei (TW)

(*) Notice: Subject to any disclaimer, the term of this patent is extended or adjusted under 35 U.S.C. 154(b) by 486 days.

(21) Appl. No.: 17/723,419

(22) Filed: Apr. 18, 2022

(65) Prior Publication Data

US 2022/0334397 A1 Oct. 20, 2022

(30) Foreign Application Priority Data

Apr. 20, 2021 (TW) ................................ 110114182

(51) Int. Cl.
*G02B 27/01* (2006.01)
*G02B 5/04* (2006.01)
*G02B 19/00* (2006.01)

(52) U.S. Cl.
CPC ........... *G02B 27/0172* (2013.01); *G02B 5/04* (2013.01); *G02B 19/0009* (2013.01)

(58) Field of Classification Search
CPC ........ G02B 2027/0116; G02B 27/0172; G02B 2027/0178
See application file for complete search history.

(56) References Cited

U.S. PATENT DOCUMENTS

| | | | |
|---|---|---|---|
| 2003/0030596 A1 | 2/2003 | Park | |
| 2018/0157453 A1* | 6/2018 | Yang | ..................... G02B 5/04 |
| 2020/0150405 A1* | 5/2020 | Bates | ................. G02B 27/0172 |

FOREIGN PATENT DOCUMENTS

| | | |
|---|---|---|
| CN | 106226907 | 12/2016 |
| CN | 106646892 | 5/2017 |
| CN | 106662750 | 5/2017 |
| CN | 111696446 | 9/2020 |
| CN | 113671703 | 11/2021 |
| GB | 355468 | 8/1931 |
| TW | 201723584 | 7/2017 |
| TW | I596377 | 8/2017 |
| TW | 202026698 | 7/2020 |
| TW | 202104976 | 2/2021 |

* cited by examiner

*Primary Examiner* — Ryan D Howard
(74) *Attorney, Agent, or Firm* — JCIPRNET

(57) ABSTRACT

A head mounted display including two display units is provided. An included angle between the two display units is greater than 0 degrees and less than 180 degrees. Each of the two display units includes a display device, a condenser lens and a prism. The condenser lens overlaps the display device. The prism overlaps the condenser lens and the display device. A material of one of the condenser lens and the prism includes flint glass, and a material of the other of the condenser lens and the prism includes crown glass.

9 Claims, 5 Drawing Sheets

HEAD MOUNTED DISPLAY

CROSS-REFERENCE TO RELATED APPLICATION

This application claims the priority benefit of Taiwan application serial no. 110114182, filed on Apr. 20, 2021. The entirety of the above-mentioned patent application is hereby incorporated by reference herein and made a part of this specification.

BACKGROUND

Technical Field

This disclosure relates to a display, and in particular to a head mounted display.

Description of Related Art

A head mounted display usually adopts the form of an eye mask or a helmet to dispose a display device in front of the eyes of a user, and project an imaging light outputted by the display device into the eyes of the user through a lens element. Although efforts have been made to improve image quality of the existing head mounted display, more can be done to address the issue of color separation in a direct vision region of the eye.

SUMMARY

This disclosure provides a head mounted display which has good imaging quality.

A head mounted display according to an embodiment of the disclosure includes two display units. An included angle between the two display units is greater than 0 degrees and smaller than 180 degrees. Each of the two display units includes a display device, a condenser lens, and a prism. The condenser lens overlaps the display device. The prism overlaps the condenser lens and the display device. A material of one of the condenser lens and the prism includes flint glass, and a material of the other of the condenser lens and the prism includes crown glass.

In an embodiment of the disclosure, each of the two display units includes multiple condenser lenses.

In an embodiment of the disclosure, the prism is located between the multiple condenser lenses and the display device.

In an embodiment of the disclosure, the prism is located between the multiple condenser lenses.

In an embodiment of the disclosure, the multiple condenser lenses are located between the prism and the display device.

In an embodiment of the disclosure, the prism has a first surface, a second surface, and a third surface. The second surface is opposite to the first surface and is located between the first surface and the display device. The third surface is connected to the first surface and the second surface near an inner side of the head mounted display. A first included angle is between the first surface and the second surface near an outer side of the head mounted display. A second included angle is between the second surface and the third surface near the inner side of the head mounted display. The first included angle is smaller than the second included angle.

In an embodiment of the disclosure, the first included angle is greater than 0 degrees and smaller than or equal to 60 degrees.

In an embodiment of the disclosure, the prism includes multiple prism rods that are arranged from the inner side of the head mounted display to the outer side of the head mounted display. Each of the multiple prism rods has a fourth surface, a fifth surface, and a sixth surface. The fifth surface is opposite to the fourth surface, and is located between the fourth surface and the display device. The sixth surface is connected to the fourth surface and the fifth surface. A third included angle is between the fourth surface and the fifth surface. A fourth included angle is between the fifth surface and the sixth surface. The third included angle is smaller than the fourth included angle.

In an embodiment of the disclosure, the prism includes at least one curved surface.

In an embodiment of the disclosure, each of the two display units further includes a diffractive optical element. The diffractive optical element overlaps the condenser lens, the display device, and the prism.

Based on the above, in the embodiment of the disclosure, the field of view of the head mounted display is enlarged by the design of disposing the two display units obliquely, and the chromatic aberration is eliminated by the material combination of the condenser lens and the prism. Therefore, the head mounted display can have a large field of view and good imaging quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
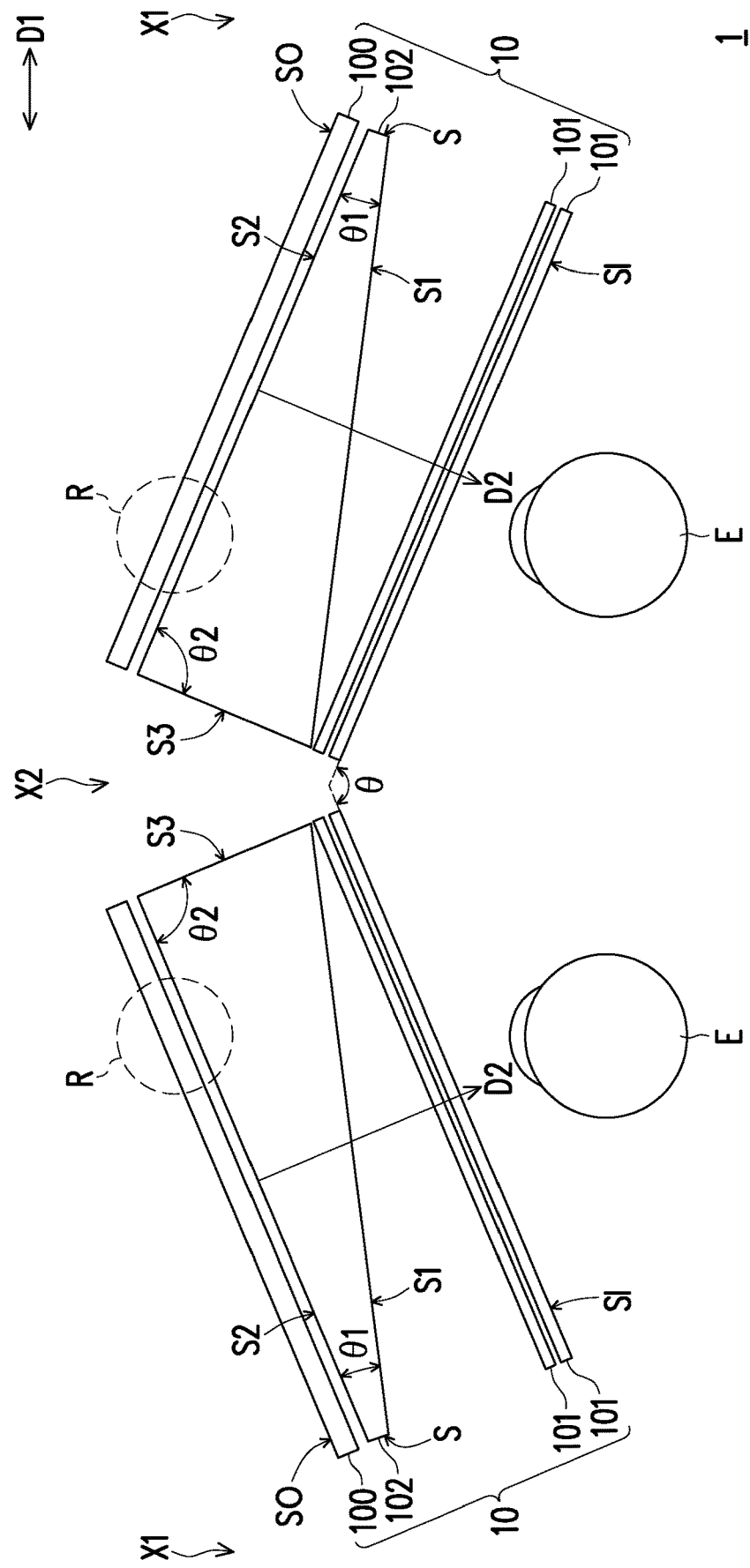
FIGS. 1 to 5 are schematic diagrams of head mounted displays according to embodiments of the disclosure.

Directional terms mentioned in this specification, such as "up", "down", "front", "back", "left", and "right", are used with reference to the orientation of the drawing(s) being described. As such, the directional terminology is used for purposes of illustration and is in no way limiting.

In the attached drawings, each drawing depicts general features of the method, structure, or material used in a specific embodiment. However, the drawings should not be construed as defining or limiting the scope or nature covered by the embodiments. For example, for the sake of clarity, the relative size, thickness, and position of each layer, region, or structure may be reduced or enlarged.

In the following embodiments, the same or similar elements use the same or similar reference numerals, and redundant description is omitted. In addition, the features in different embodiments may be combined without conflict, and simple equivalent changes and modifications made in accordance to this specification or the scope of the patent application still fall within the scope of this patent.

The terms "first" and "second" mentioned in this specification or the scope of the patent application are only meant to name discrete elements or to distinguish different embodiments or ranges, and are not intended to limit an upper limit or a lower limit of the number of elements. The terms are also not intended to limit a manufacturing order or a disposition order of the elements. In addition, the disposition of one element/film layer on (or above) another element/film layer may include the element/film layer being directly disposed on (or above) the other element/film layer, in which two elements/film layer are in direct contact with each other, and the element/film layer being indirectly disposed on (or above) the other element/film layer, in which there are one or more elements/film layers between the two elements/film layers.

FIGS. 1 to 4 are schematic diagrams of a head mounted display according to an embodiment of the disclosure. In FIGS. 1 to 4, in addition to the head mounted display, the eyes of an user are also schematically drawn to facilitate understanding of a relative relationship between the head mounted display and the user. In any of the embodiments in FIGS. 1 to 4, an application category of the head mounted display may include, but is not limited to, virtual reality (VR).

With reference to FIG. 1, a head mounted display 1 includes two display units 10. The two display units 10 are respectively disposed in front of eyes E of an user. There is an included angle θ between the two display units 10. The included angle θ may be an included angle between two inner surfaces SI of the two display units 10. Alternatively, the included angle θ may be an included angle between two outer surfaces SO of the two display units 10. The included angle θ is equal to 180 degrees, which means that the two display units 10 are disposed side by side in front of the eyes E of the user. In the embodiment, the included angle θ between the two display units 10 is greater than 0 degrees and smaller than 180 degrees. In other words, the two display units 10 are obliquely disposed in front of the eyes E of the user. With this design, a field of view in a horizontal direction D1 of the head mounted display 1 may be improved. That is, an imaging range of an image in the horizontal direction D1 is enlarged.

Each of the two display units 10 includes a display device 100, a condenser lens 101, and a prism 102. The display device 100, the condenser lens 101, and the prism 102 are arranged in a normal direction D2 of the display device 100, and the display device 100, the condenser lens 101 and the prism 102 overlap each other in the normal direction D2.

Figure 5:
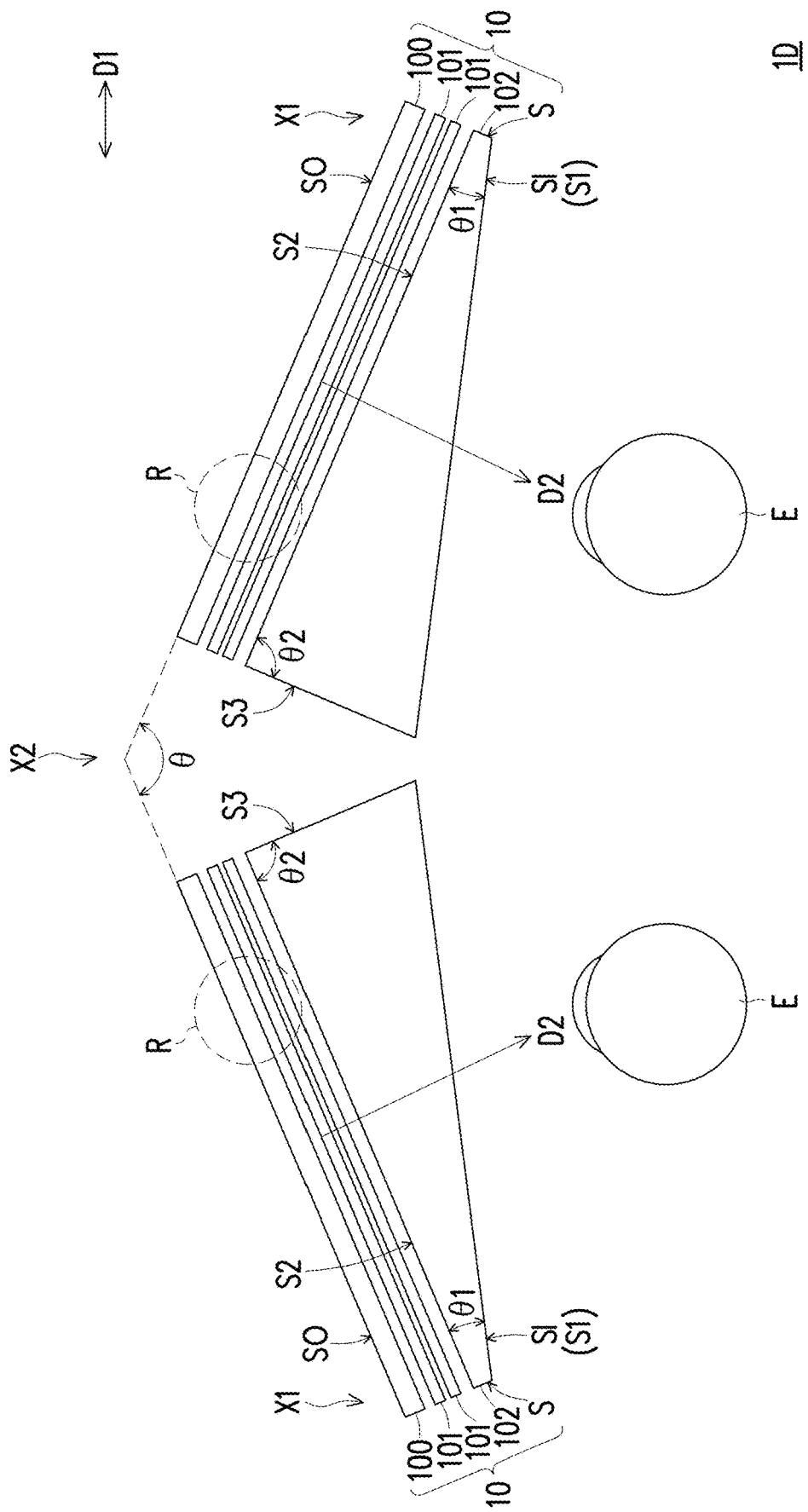

In the embodiment, each of the two display units 10 includes multiple (for example, two) condenser lenses 101, and the display device 100, the prism 102, and the multiple condenser lenses 101 are sequentially arranged in the normal direction D2. In other words, the prism 102 is located between the multiple condenser lenses 101 and the display device 100. However, the number of elements in the display unit 10 or an arrangement order of the multiple elements may be changed according to requirements. In an embodiment, each of the two display units 10 may include one or more of the condenser lenses 101. In an embodiment, the prism 102 may be located in between the multiple condenser lenses 101. In an embodiment, the multiple condenser lenses 101 may be located between the prism 102 and the display device 100 (e.g., see the head mounted display 1D in FIG. 5). The following embodiments may be modification of the above, and descriptions are not repeated below.

The outer surface SO of the display unit 10 may be defined as a surface of an element among the display device 100, the condenser lens 101, and the prism 102 that is furthest away from the eye E of the user, and the surface of the element faces away from the eyes E. The inner surface SI of the display unit 10 may be defined as a surface of an element among the display device 100, the condenser lens 101, and the prism 102 that is nearest to the eye E of the user, and the surface of the element faces the eyes E. With reference to the architecture in FIG. 1, the outer surface SO of the display unit 10 is a surface of the display device 100 facing away from the prism 102, and the inner surface SI of the display unit 10 is a surface facing the eye E of a condenser lens that is nearer to the eyes E of the user among the two condenser lenses 101. When the arrangement order of the multiple elements in the display unit 10 changes, the inner surface SI of the display unit 10 changes accordingly. For example, when the multiple condenser lenses 101 are located between the prism 102 and the display device 100, the inner surface SI of the display unit 10 is a surface of the prism 102 facing the eye E of the user.

The display device 100 is suitable for providing an imaging light with image information (such as grayscale and color information). For example, the display device 100 may be a liquid crystal display, but the disclosure is not limited thereto.

The condenser lens 101 and the prism 102 are stacked between the display device 100 and the eye E of the user, and the condenser lens 101 and the prism 102 are suitable for transmitting an imaging light outputted by the display device 100 to the eyes E of the user.

A material of one of the condenser lens 101 and the prism 102 includes flint glass, and a material of the other of the condenser lens 101 and the prism 102 includes crown glass. The flint glass has a high refractive index and a low Abbe number. The crown glass has a low refractive index and a high Abbe number. The embodiment utilizes a characteristic of the two glasses to eliminate chromatic aberration, in which dispersion of the two glasses compensate (cancel) each other, thereby improving image quality.

In the embodiments in FIGS. 1 to 4, each of the condenser lenses 101 is schematically shown as a flat plate. However, the number of the condenser lens 101 included in each of the display units 10 and the optical parameter design of each condenser lens 101 (such as curvature, refractive index, and distance from other elements) may be changed according to design requirements. Specifically, each of the display units 10 may include one or more condenser lenses 101. When the display unit 10 includes multiple condenser lenses 101, the multiple condenser lenses 101 may have the same or different optical parameter designs. In addition, the two display units 10 disposed in front of the eyes E may have equal or unequal numbers of condenser lenses 101, and the equal or unequal numbers of condenser lenses 101 may have the same or different optical parameter designs.

In FIG. 1, the prism 102 has a first surface S1, a second surface S2, and a third surface S3. The second surface S2 is opposite to the first surface S1 and is located between the first surface S1 and the display device 100. The third surface S3 is connected to the first surface S1 and the second surface S2 near to an inner side X2 of the head mounted display 1. There is a first included angle θ1 between the first surface S1 and the second surface S2 near an outer side X1 of the head mounted display 1. There is a second included angle θ2 between the second surface S2 and the third surface S3 near the inner side X2 of the head mounted display 1. The first included angle θ1 is smaller than the second included angle θ2. For example, the first included angle θ1 and the second included angle θ2 may both be acute angles. Alternatively, the first included angle θ1 may be an acute angle, and the second included angle θ2 may be a right angle or an obtuse angle. Chromatic aberration of a more frequently focused region (including a direct view region R) of the eye may be effectively eliminated by the design of the acute angle pointing towards the outer side X1 of the head mounted display 1.

In an embodiment, the first included angle θ1 is greater than 0 degrees and smaller than or equal to 60 degrees, which allows good imaging quality and is beneficial in reducing weight and thickness of the head mounted display 1. In an embodiment, the first included angle θ1 is greater than or equal to 20 degrees and smaller than or equal to 30 degrees, which can further improve the imaging quality and reduce the weight and the thickness. An angle range of the second included angle θ2 may be changed according to requirements, and is not limited by the disclosure.

In the embodiment, the prism 102 is a hexahedron, and the prism 102 further has a surface S, a top surface (not shown), and a bottom surface (not shown) that are opposite to the third surface S3. Each surface in the hexahedron is, for example, a flat surface. However, a total number of the surfaces of the prism 102 or a curved surface design (such as a flat surface, a spherical surface, an aspheric surface, and a radius of curvature) of each of the surfaces may be changed according to requirements, and is not limited to what is shown in FIG. 1.

Figure 2:
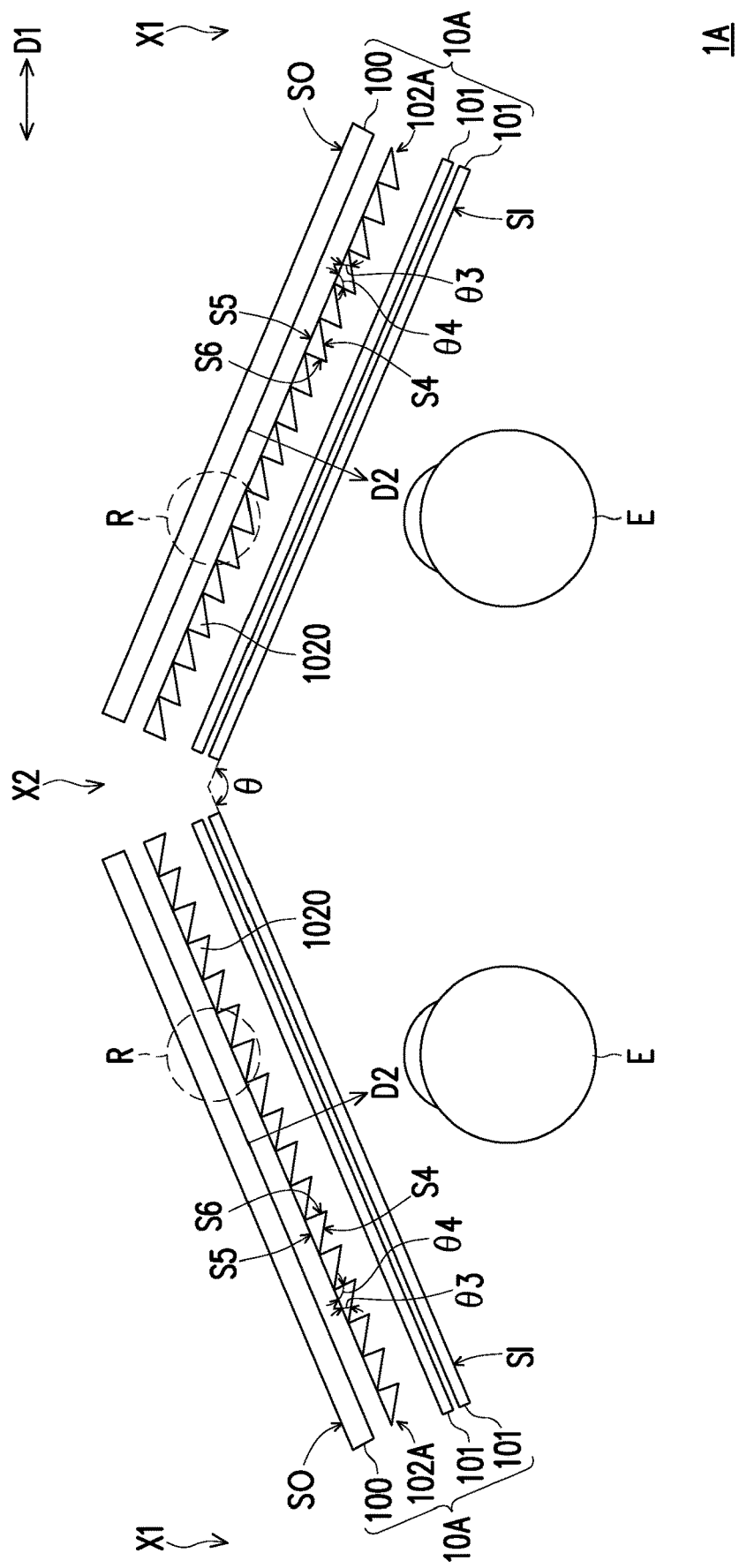

With reference to FIG. 2, a main difference between a head mounted display 1A and the head mounted display 1 in FIG. 1 is as follows. In each display unit 10A of the head mounted display 1A, a prism 102A includes multiple prism rods 1020 arranged from the inner side X2 of the head mounted display 1A to the outer side X1 of the head mounted display 1A. The multiple prism rods 1020 are, for example, connected to each other and respectively extend in an incident direction of the paper surface.

Each of the multiple prism rods 1020 has a fourth surface S4, a fifth surface S5, and a sixth surface S6. The fifth surface S5 is opposite to the fourth surface S4 and is located between the fourth surface S4 and the display device 100. The sixth surface S6 is connected to the fourth surface S4 and the fifth surface S5. There is a third included angle θ3 between the fourth surface S4 and the fifth surface S5. There is a fourth included angle θ4 between the fifth surface S5 and the sixth surface S6. The third included angle θ3 is smaller than the fourth included angle θ4. The third included angle θ3 and the fourth included angle θ4 may both be acute angles. Alternatively, the third included angle θ3 may be an acute angle, and the fourth included angle θ4 may be a right angle or an obtuse angle. The chromatic aberration of the more frequently focused region (including the direct view region R) of the eye may be effectively eliminated by the design of the acute angle pointing towards the outer side X1 of the head mounted display 1A. In addition, the design of the multiple prism rods 1020 can effectively reduce a thickness of the head mounted display 1A in the normal direction D2 and an overall weight of the head mounted display 1A.

In an embodiment, the third included angle θ3 is greater than 0 degrees and smaller than or equal to 60 degrees, which allows good imaging quality and is beneficial in reducing the weight and the thickness of the head mounted display 1A. In an embodiment, the third included angle θ3 is greater than or equal to 20 degrees and less than or equal to 30 degrees, which can further improve the imaging quality and reduce the weight and the thickness. An angle range of the fourth included angle θ4 may be changed according to requirements, and is not limited by the disclosure.

Figure 3:
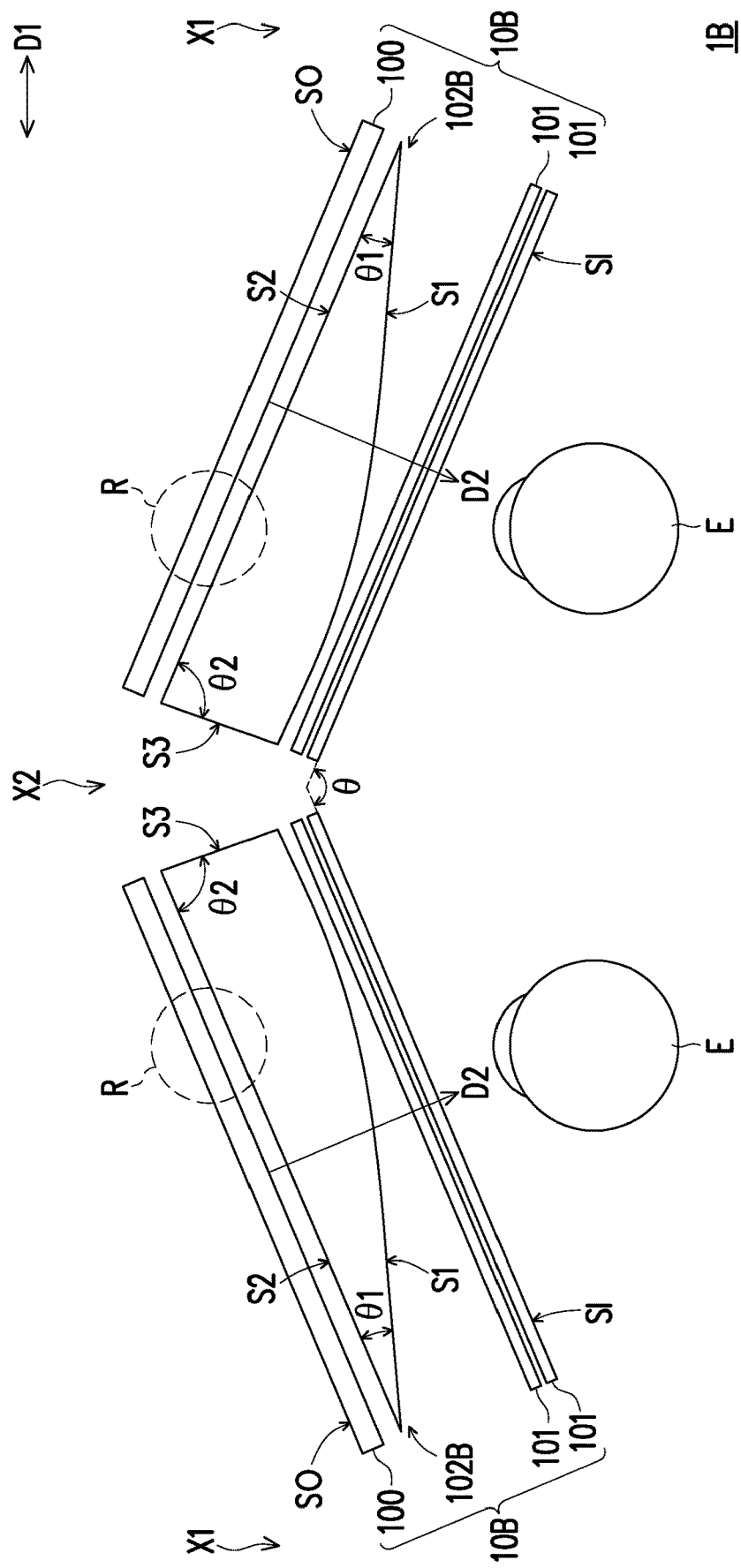

With reference to FIG. 3, a main difference between a head mounted display 1B and the head mounted display 1 in FIG. 1 is as follows. In each display unit 10B of the head mounted display 1B, a prism 102B includes at least one curved surface. In FIG. 3, the first surface S1 is a curved surface protruding toward the eye E of the user, and the second surface S2 is a flat surface. However, the optical parameter design of each of the surfaces of the prism 102B and the included angle between two adjacent surfaces may be changed according to requirements. In an embodiment, the first surface S1 may be a curved surface recessing towards an interior of the prism 102B, and the second surface S2 may be a curved surface protruding toward the display device 100. In an embodiment, the first surface S1 may be a curved surface protruding toward the eye E of the user, and the second surface S2 may be a curved surface protruding toward the display device 100. In an embodiment, the prism 102B may be a glued lens assembly.

The curved surface design of the prism 102B may not only divert a light path and compensate for the chromatic aberration, but also provides a condensation effect, which helps to reduce a thickness of the head mounted display 1B in the normal direction D2. In addition, since the curved surface of the prism 102B may provide a portion of the condensation effect, the condensation effect required by the condenser lens 101 is reduced, which helps to reduce difficulty in manufacturing the condenser lens 101.

Figure 4:
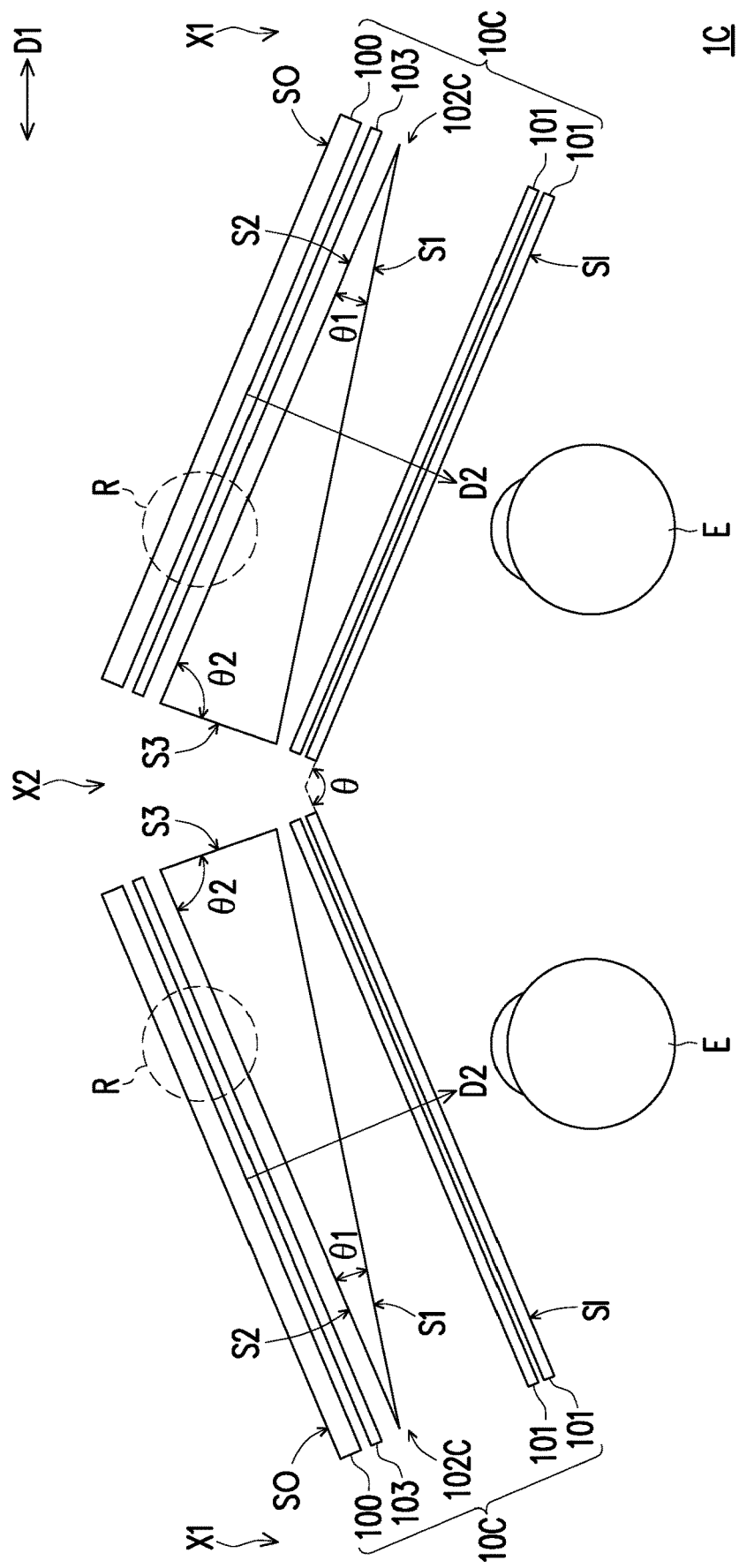

With reference to FIG. 4, a main difference between a head mounted display 1C and the head mounted display 1 in FIG. 1 is as follows. In each display unit 10C of the head mounted display 1C, a prism 102C is a pentahedron. Specifically, the prism 102C has the first surface S1 to the third surface S3, a top surface (not shown), and a bottom surface (not shown). Each of the surfaces in the pentahedron is, for example, a flat surface. However, the total number of surfaces of the prism 102C or a curved surface design of each of the surfaces may be changed according to requirements, and is not limited to what is shown in FIG. 4.

In the head mounted display 1C, each of the two display units 10C further includes a diffractive optical element (DOE) 103 to assist in the elimination of the chromatic aberration. The diffractive optical element 103 overlaps the condenser lens 101, the display device 100, and the prism 102C in the normal direction D2. The diffractive optical element 103 may be first formed on a substrate (such as glass; not shown) and then disposed at any position between the display device 100 and the eye E of the user. Alternatively, the diffractive optical element 103 may be first formed on a film (not shown), and then attached to at least one surface between the display device 100 and the eye E of the user. Alternatively, the diffractive optical element 103 may be directly formed on at least one surface between the display device 100 and the eye E of the user.

In summary, in the embodiments of the disclosure, the field of view of the head mounted display is enlarged by the design of disposing the two display units obliquely, and the chromatic aberration is eliminated by the material combination of the condenser lens and the prism. Therefore, the head mounted display can have a large field of view and good imaging quality. In an embodiment, the chromatic aberration of the more frequently focused region (including the direct view region) of the eye may be effectively eliminated by the design of the acute angle of the prism pointing towards the outer side of the head mounted display. In an embodiment, the imaging quality can be improved and a lighter and thinner head mounted display may be obtained through the design of the angle range of the prism. In an embodiment, the thickness of the head mounted display in the normal direction of the display device and the overall weight of the head mounted display can be effectively reduced by the design of the multiple prism rods. In an embodiment, the condensation effect may be provided by the curved surface design of the prism, thereby helping to reduce the thickness of the head mounted display in the normal direction of the display device or facilitating the manufacture of the condenser lens. In an embodiment, the elimination of the chromatic aberration can be assisted by the disposition of the diffractive optical element.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A head mounted display, comprising:
   two display units, wherein an included angle between the two display units is greater than 0 degrees and less than 180 degrees, and each of the two display units comprises:
   a display device;
   a condenser lens, overlapping the display device; and
   a prism, overlapping the condenser lens and the display device, wherein a material of one of the condenser lens and the prism comprises flint glass, and a material of the other of the condenser lens and the prism comprises crown glass, and
   wherein each of the two display units comprises a plurality of the condenser lenses.

2. The head mounted display according to claim 1, wherein the prism is located between the plurality of condenser lenses and the display device.

3. The head mounted display according to claim 1, wherein the prism is located between the plurality of condenser lenses.

4. The head mounted display according to claim 1, wherein the plurality of condenser lenses is located between the prism and the display device.

5. The head mounted display according to claim 1, wherein the prism has a first surface, a second surface, and a third surface, the second surface is opposite to the first surface and is located between the first surface and the display device, the third surface is connected to the first surface and the second surface near an inner side of the head mounted display, a first included angle is between the first surface and the second surface near an outer side of the head mounted display, a second included angle is between the second surface and the third surface near the inner side of the head mounted display, and the first included angle is smaller than the second included angle.

6. The head mounted display according to claim 5, wherein the first included angle is greater than 0 degrees and smaller than or equal to 60 degrees.

7. The head mounted display according to claim 1, wherein the prism comprises a plurality of prism rods that are arranged from an inner side of the head mounted display to an outer side of the head mounted display, each of the plurality of prism rods has a fourth surface, a fifth surface, and a sixth surface, the fifth surface is opposite to the fourth surface and is located between the fourth surface and the display device, the sixth surface is connected to the fourth surface and the fifth surface, a third included angle is between the fourth surface and the fifth surface, a fourth included angle is between the fifth surface and the sixth surface, and the third included angle is smaller than the fourth included angle.

8. The head mounted display according to claim 1, wherein the prism comprises at least one curved surface.

9. The head mounted display according to claim 1, wherein each of the two display units further comprises:
   a diffractive optical element, overlapping the condenser lens, the display device, and the prism.

* * * * *